United States Patent [19]

Sinberg

[11] Patent Number: 4,866,768
[45] Date of Patent: Sep. 12, 1989

[54] STATION LINE INTERFACE CIRCUIT FOR A TELECOMMUNICATION NETWORK

[75] Inventor: Howard Sinberg, Coral Springs, Fla.

[73] Assignee: Siemens Corporate Research & Support, Inc., Iselin, N.J.

[21] Appl. No.: 6,317

[22] Filed: Jan. 14, 1987

Related U.S. Application Data

[62] Division of Ser. No. 749,064, Jun. 26, 1985, abandoned.

[51] Int. Cl.⁴ .................................................. H04M 19/00
[52] U.S. Cl. ...................................... 379/413; 379/399
[58] Field of Search ............... 379/413, 324, 322, 400, 379/399, 29, 398, 405, 345

[56] References Cited

U.S. PATENT DOCUMENTS

| | | | |
|---|---|---|---|
| 4,178,485 | 12/1979 | Cowpland et al. | 179/18 FA |
| 4,203,009 | 5/1980 | Tattersall | 179/16 AA |
| 4,281,219 | 6/1981 | Cowpland et al. | 179/18 FA |
| 4,284,859 | 8/1981 | Araseki | 179/170 NC |
| 4,301,336 | 11/1981 | Müting | 179/170 NC |
| 4,358,644 | 11/1982 | Hubler | 179/170 NC |
| 4,395,599 | 7/1983 | Seidel | 179/170 NC |
| 4,476,350 | 10/1984 | Aull et al. | 379/413 X |
| 4,485,277 | 11/1984 | Minch et al. | 179/170 NC |
| 4,525,602 | 6/1985 | Robra et al. | 379/413 X |
| 4,536,624 | 8/1985 | Lyle | 179/170 NC |
| 4,563,547 | 1/1986 | Booth | 379/399 X |
| 4,595,796 | 6/1986 | Robra et al. | 379/27 |
| 4,612,417 | 9/1986 | Toumani | 379/413 |
| 4,631,359 | 12/1986 | Johansson et al. | 379/324 |
| 4,631,360 | 12/1986 | Johansson et al. | 379/324 |
| 4,685,130 | 8/1987 | Burns | 379/413 |
| 4,709,388 | 11/1987 | Defretin | 379/413 |

FOREIGN PATENT DOCUMENTS

| 0157369 | 8/1985 | Japan | 379/413 |
|---|---|---|---|
| 0058369 | 3/1986 | Japan | 379/399 |

Primary Examiner—Jin F. Ng
Assistant Examiner—Randall S. Vaas
Attorney, Agent, or Firm—Adel A. Ahmed

[57] ABSTRACT

A telephone station subscriber line interface circuit for connecting a telephone subscriber station to a telecommunications transmission line comprises a loop current sensing circuit for providing an output signal proportionately representative of DC resistance in the telecommunications transmission line. A ring-side driving circuit is coupled to the loop current sensing circuit and is responsive to the output signal for providing an alternating current voltage source and a direct current voltage source to a transmit amplifier in periods of high constant DC resistance in the telecommunications transmission line, the ring-side driving circuit maintaining the output of the alternating current voltage source constant to the transmit amplifier and automatically transferring from a constant direct current voltage source to a constant direct current current source in the event of a decrease in the DC resistance in the telecommunications transmission line sensed by the loop curent sensing circuit.

2 Claims, 3 Drawing Sheets

STATION LINE INTERFACE CIRCUIT FOR A TELECOMMUNICATION NETWORK

CROSS-REFERENCE TO RELATED APPLICATION

This is a division of application Ser. No. 749,064 filed June 26, 1985, now abandoned.

BACKGROUND OF THE INVENTION

The present invention relates to a station line interface circuit for connection a subscriber station, such as a telephone, to a telecommunications network, such as a private automatic branch exchange ("PABX").

Station line interface circuits, also known as "subscriber line interface circuits", are well known in the art. The basic purpose of a this type of circuit is to convert two wire balanced voice signals to either two or four wire unbalanced signals. Stated another way, the station line interface circuit makes the conversion between a station loop circuit (comprising, e.g. a tip lead, a telephone instrument and ring lead) and a two-way (transmit and receive) voice path of a telecommunications network to which other telephones, trunk circuits, announcement recordings or tone sources may be connected.

Ancillary functions of a station line interface circuit include electronically limiting the amount of current that is supplied to the station loop, monitoring the loop so as to determine whether a telephone in the loop circuit is on or off hook, injecting ringing voltage into the loop circuit to alert a telephone user to an incoming call, protecting against overvoltage conditions which may be imposed on the loop by accidental connection to power lines or by nearby lightning strikes, and selectively denying current to the loop upon receipt of an external command.

The transition between a two-wire telephone loop and four-wire (transmit and receive) transmission paths is effected by a so-called "hybrid" circuit. The U.S. Pat. Nos. 4,178,485; 4,281,219 and 4,485,277 disclose transformerless hybrid circuits which serve this function. However, all of the ancillary functions indicated above have not been provided for in these known hybrid circuits.

One of the principal disadvantages of these known circuits is that the circuit impedance appearing across the tip and ring leads remains constant no matter how long or short the wire telephone lines may be. If the telephone lines are extremely long, the loop resistance (wire resistance plus the resistance of the telephone instrument) will be high and, consequently, the current delivered to the instrument will be low. Conversely, if the two-wire pair is extremely short, excessive current will be delivered to the telephone instrument, creating heat and wasting power.

It is desirable, therefore, to provide a station line interface circuit which appears as a voltage source when the two-wire lines connected to it are extremely long and appears as a current source when these lines are short.

SUMMARY OF THE INVENTION

It is therefore a principal object of the present invention to provide a station line interface circuit which is capable of controlling the station loop impedance; that is, the impedance of the interface circuit as measured across the tip and ring leads.

It is a further object of the present invention to provide a station line interface circuit which prevents the delivery of excessive current to the station loop.

It is a further object of the present invention to provide a station line interface circuit with overvoltage protection on the tip and ring leads.

It is a further object of the present invention to provide a station line interface circuit which is responsive to a control signal to immediately deny power to the station loop.

It is a further object of the present invention to provide a station line interface circuit which delivers a balanced AC voltage to the tip and ring leads.

It is a further object of the present invention to provide a station line interface circuit which permits the injection of "ringer current" for ringing the subscriber station.

These objects, as well as other objects which will become apparent in the discussion that follows are achieved, according to the present invention, by providing the station line interface circuit ("SLIC") with a "network interface circuit", coupling the transmit and receive paths of the SLIC to the I/O port of the telecommunications network to which the SLIC is connected, for controlling feedback between the transmit and receive paths in a direction tending to maintain a constant impedance at the tip and ring port.

For a full understanding of the present invention, reference should now be made to the following detailed description of the preferred embodiment of the invention and to the accompanying drawings.

DESCRIPTION OF THE PREFERRED EMBODIMENT

Figure 1:
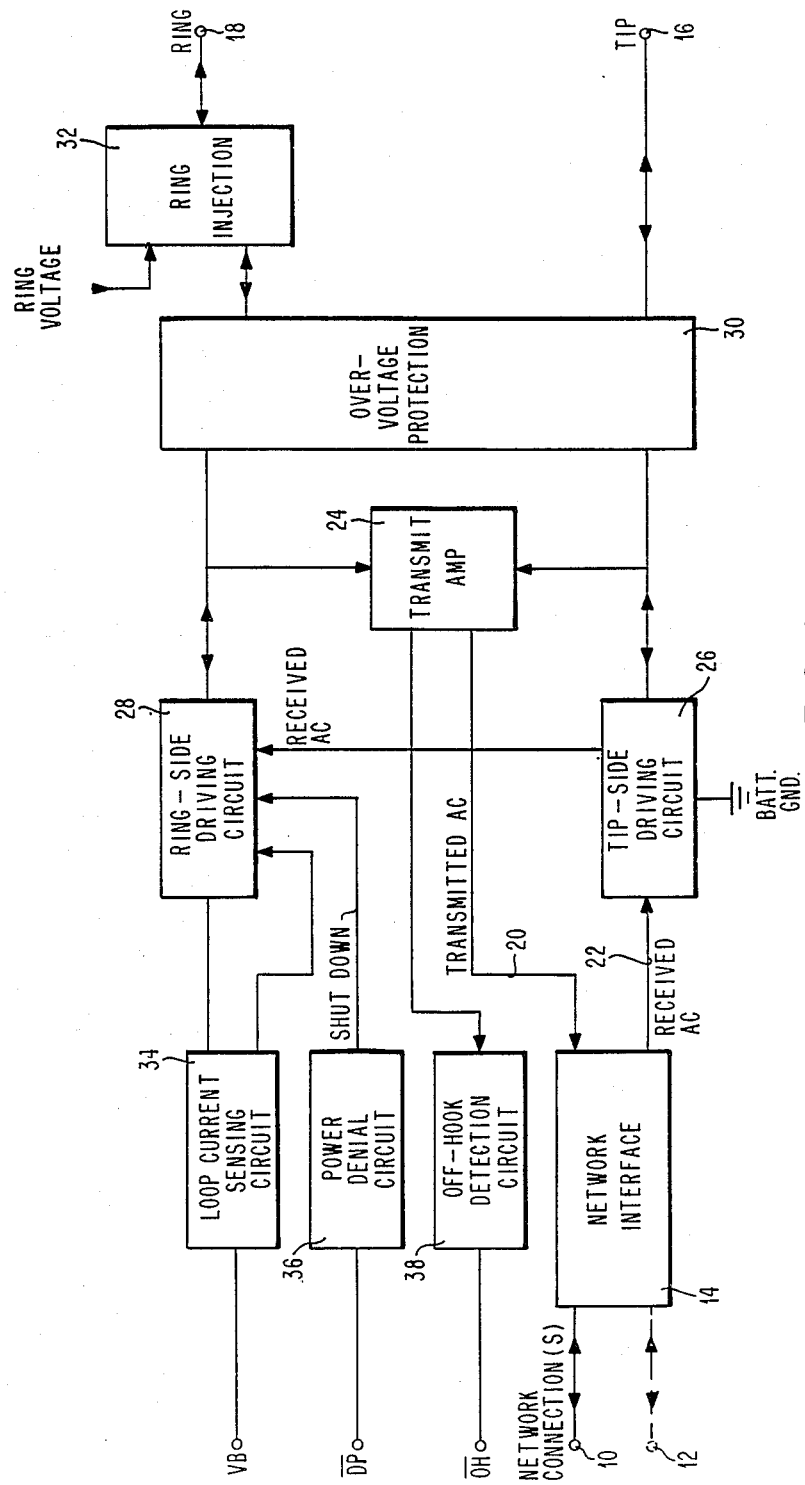
FIG. 1 is a block diagram of the station line interface circuit according to a preferred embodiment of the present invention.

The preferred embodiment of the present invention will now be described with reference to FIGS. 1-5 of the drawings. Identical elements in the various figures are assigned the same reference numerals.

Figure 2:
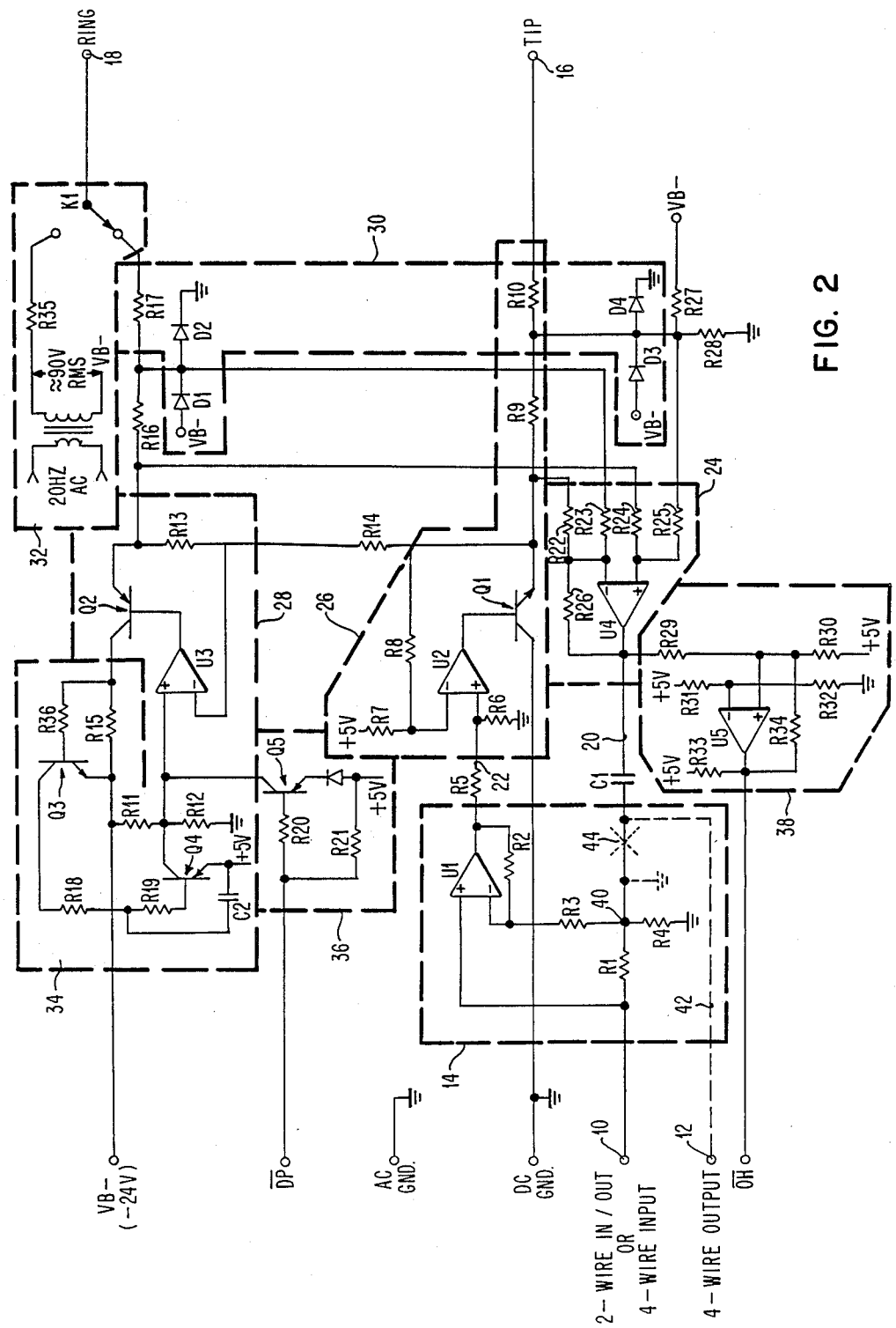
FIG. 2 is a schematic diagram of the station line interface circuit shown in FIG. 1.

The preferred embodiment of the station line interface circuit is shown diagramatically in FIG. 1 and schematically in FIG. 2. The blocks illustrated in FIG. 1 are identified by dashed lines in the schematic diagram of FIG. 2.

FIG. 1 shows the principal elements of the station line interface circuit ("SLIC") according to the invention. The circuit serves to interface either an unbalanced two-wire or unbalanced four-wire line of a telecommunications network with the balanced two-wire line (tip and ring leads) of a subscriber station.

The network connection terminals 10 (for a two-wire circuit) or 10 and 12 (for a four-wire circuit) are coupled to a network interface circuit 14. This network interface controls feedback between the transmit and receive paths in a direction tending to maintain a constant circuit impedance as seen by the station loop connected to the tip and ring terminals 16 and 18, respectively.

The transmit and receive paths 20 and 22, which are connected at one end to the network interface circuit 14, are connected at their opposite ends to the transmit amplifier 24 and the tip-side driving circuit 26. The transmit amplifier receives outputs from both the tip-side driving circuit 26 and the ring-side driving circuit 28, as well as from the tip and ring leads, and generates the transmitted AC signal. This amplifier circuit also provides cancellation of the received AC signal so that the latter does not appear in the transmitted AC signal.

Protection against overvoltage conditions on the station loop caused by accidental connection of the tip or ring leads to power lines or by nearby lightning strikes is provided by the overvoltage protection circuit 30.

AC ring voltage for ringing the bell at the subscriber station is injected by means of a ring injection circuit 32. The circuits 34, 36 and 38 provide loop current sensing, power denial and off hook detection, respectively.

The various circuits shown in FIG. 1 are shown in detail in FIG. 2.

As shown in FIG. 2, the network interface circuit comprises an operational amplifier U1 having negative feedback through the resistor R2. Resistors R1, R3 and R4 are connected together at a node 40 which also receives the transmitted AC on the transmit path 20.

If a four-wire connection is to be made to the telecommunications network, the transmit path 20 is connected directly to the four-wire output terminal 12 via the line 42 indicated in dashed lines. In this case, the connection to the node 40 is interrupted a indicated by the dashed cross 44 and the node 40 is connected directly to ground.

The tip side driving circuit 26 comprises an amplifier stage U2 and an NPN transistor Q1 connected to form a feedback loop for the amplifier U2. The amplifier U2 and transistor Q1 convey the received AC signal on line 22 to the tip side of the station loop through a tip feed resistance R9 and R10. The transistor Q1 allows the tip side of the loop to be maintained substantially at ground potential without drawing loop current from a positive voltage source.

The basic ring-side driving circuit 28 provides a constant voltage source for both DC and AC. If the loop resistance decreases, however, the DC loop current (and the voltage drop across resistor R15) increases, causing both transistors Q3 and Q4 to begin conducting. This makes the noninverting input of U3 more positive and lowers the negative output voltage of the emitter of Q2. An equilibrium is then attained in which decreases in loop resistance cause corresponding decreases in DC output voltage. As a result the DC loop current remains substantially constant without any effect on the AC performance of the ring-side driving circuit. Therefore, as loop resistance decreases the ring-side feed circuit is caused automatically to transfer from a constant DC voltage source to a constant DC current source, while remaining a constant AC voltage source.

In addition, the loop current can be decreased to zero by grounding the "deny power" input DP. This grounding causes transistor Q5 to conduct, putting a positive bias on the inverting input of U3 and shutting down Q2 so that the loop current is decreased to zero.

The ring-side driving circuit 28 consists of an amplifier stage U3 which includes within its feedback loop a PNP transistor Q2. This arrangement serves to source current to the station loop through a ring feed resistance R16 and R17 from the negative voltage source (VB−). It also modulates this current to impose on the ring-side of the loop an AC voltage component equal in amplitude but opposite in phase to any AC voltage component imposed on the tip side of the loop by the tip-side driving circuit.

The loop current sensing circuit 34 comprises a first biasing circuit consisting of an NPN transistor Q3, a PNP transistor Q4 and associated resistors, and a capacitor. In the case of an open or high resistance station loop the circuit causes the ring-side driving circuit to establish a negative voltage on the ring side of the loop. In the case of a lower resistance or short circuit in the loop this circuit causes the ring-side driving circuit to establish a maximum loop current while continuing to impose on the loop an AC voltage which is essentially unaffected by the loop resistance or loop current. Therefore, the ring-side driving circuit in a low resistance condition is simultaneously a constant current source for DC and a constant voltage source for AC.

The power denial circuit 36 comprises a second biasing circuit consisting of a PNP transistor Q5 and associated resistors and a diode. Upon application of a voltage DP from some external source the ring-side driving circuit is caused to substantially shut down and inhibit all loop current.

The transmitting amplifier and AC cancellation circuit 24 comprises a transmitting amplifier stage U4. The input of this amplifier is DC coupled to the station loop. The output voltage consists of a DC component, which is proportional to the loop current, and an AC component which is proportional to the AC voltage component imposed on the loop by a station (e.g. telephone) instrument connected to the loop circuit. However, as a result of the proper selection of loop balancing resistors R22–R25, the output contains no component which is proportional to the AC voltage components imposed on the loop by the tip-side and ring-side feed circuits. The transmitting amplifier stage also includes a DC blocking capacitor C1 which conveys the amplifier's AC output component to the SLIC's output connection. This blocking capacitor also inhibits the amplifier's DC output component from affecting any DC levels in the tip-side feed circuit, so the tip-side loop voltage is unaffected by loop current.

The off-hook voltage monitoring circuit 38, consisting of a voltage comparator U5 and associated resistors, serves as the hook-status monitor. This circuit operates by comparing the DC component of the output voltage of the transmitting amplifier (this voltage being proportional to loop current) with a reference voltage established by resistors R31 and R32, and establishing a digital output that is positive in polarity and compatible with conventional logic to indicate whether the loop is open or closed.

The voltage protection circuit 30 consists of part of the tip-feed resistance R10, part of the ring feed resistance R17 and several rectifier diodes D1 and D4. This circuit limits excessive positive loop voltages to ground and excessive negative loop voltages to the negative supply voltage (VB−). Each feed resistance is separated into two lesser resistances R10 and R17 which are connected directly to the opposite ends of the loop; all other components of the SLIC are isolated from the loop by these lesser resistances. Therefore, any excessive loop voltages (such as from contact with power lines or induced by near lightning strikes) are dropped across these lesser resistances, and the remaining circuitry of the SLIC is thereby protected. In addition, rectifier diode D4 serves as a current path for positive tip-side voltages when the SLIC is in the station ringing mode.

The various, individual circuits of the station line interface circuit will now be described in greater detail with reference to FIGS. 2-5 of the drawings.

Figure 3:
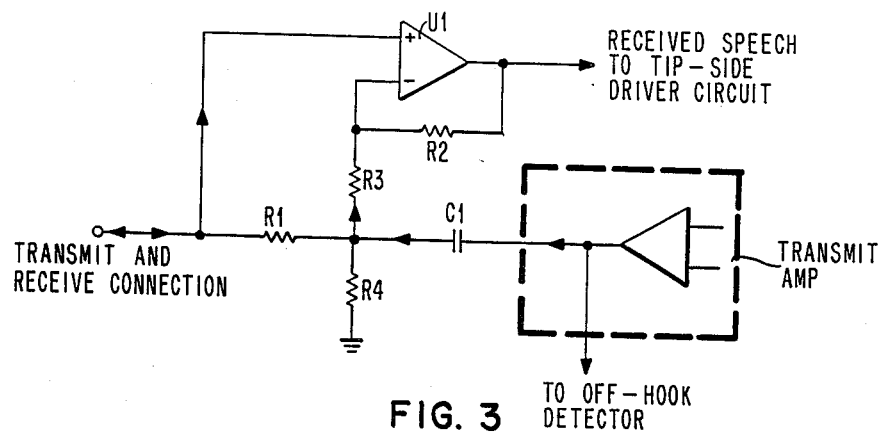
FIG. 3 is a schematic diagram of the network interface circuit shown in FIG. 2 and configured for an unbalanced two-wire interconnecting network.

1. Network Interface Circuit:

FIG. 3 shows the network interface circuit configured for an unbalanced two-wire connection to the telecommunications network. The resistor R1 establishes the network termination impedance. R2 and R3 set both the receive gain and the amount of feedback from the transmit amplifier to the station loop. The amount of feedback determines the impedance of the station line interface circuit as measured across the tip and ring terminals.

The circuit of FIG. 3 operates as follows:

In a normal circuit connection, two SLIC's are connected together thereby allowing two telephones to be in communication. This connection is achieved by joining the two-wire ports of the respective SLIC's through a switching matrix (not shown as it is not a part of the SLIC proper). The impedance of the two-wire port is approximately equal to the resistance of R1 because the transmit amplifier has a low output impedance and C1 has a low reactance in the frequency range of interest. Thus it is that in the normal connection each SLIC's two-wire port is terminated by an impedance approximately equal to the resistance of its own R1.

This terminating impedance and R1 form a voltage divider such that one half of the voltage at the output of the transmit amplifier (which is a function of the A.C. voltage across tip and ring and which we will call here Vt) is applied to the noninverting input of a differential amplifier U1. The resulting output of amplifier U1 is $(Vt/2)[1+(R2/R3)]$. The output of the transmit amplifier is also applied to the bottom of R3; this results in an output from U1 of $(-Vt)(R2/R3)$. Thus the total voltage at the output of U1 caused by Vt is $Vt\{(\frac{1}{2})[1+(R2/R3)](R2/R3)\}$. This voltage is fed back to the tip-side driver circuit causing the impedance of the loop to be modified. Because the feedback is positive (the voltage at the output of U1 is fed back to tip and ring in phase with voltages applied there from an outside source such as a telephone) the impedance at tip and ring is raised. Thus the impedance of the tip-ring termination is made higher than the sum of the feed resistors (R9, 10, 16 and 17), allowing the use of relatively low values of resistance which in turn allows a given amount of current to be supplied to a longer telephone line than would otherwise be possible.

For a signal received from the other SLIC in a connection, its voltage is amplified by a factor of $[1+(R2/R3)]$ in U1 and is fed on to the tip-side driver circuit, ultimately to be heard in the telephone connected across tip and ring.

No mention has yet been made of R4 in this discussion. Because it in effect shunts the low output impedance of the transmit output amplifier it has no effect upon signal amplitudes. It does, however, serve to establish the D.C. voltage of the two-wire port at ground level.

2. Tip-Side Driving Circuit:

The received signal from the network interface is applied to the non-inverting input of Op. Amp U2, whose output drives the emitter follower Q1. Resistors R7 and R8 establish the gain of the stage, and, because R7 is returned to +5 V (and puts a positive voltage at the inverting input of the Op. Amp.), the voltage at Q1's emitter is very slightly negative with respect to ground. U2, a conventional operational amplifier, requires a positive supply voltage that is several volts more positive than the most positive output required of it, but because the collector of the transistor Q1 (which sinks loop current) is returned to ground, an output at Q1's emitter can be set near ground without having to draw loop current from this positive supply voltage. Resistors R9 and R10 and the amount of feedback from the network interface establish the desired tip-side output impedance of the SLIC.

Figure 4:
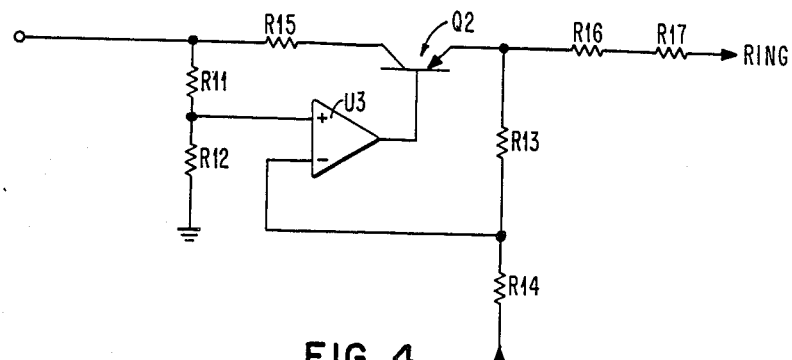
FIG. 4 is a schematic diagram of the basic ring-side driving circuit of FIG. 2.

3. Ring Side Driving Circuit:

Referring to FIG. 4, resistors R11 and R12 establish a bias at the non-inverting input of U3 so as to set the emitter of Q2 a few volts less negative than the negative power supply (VB−). R13 and R14 are equal value resistors, with the inverting input of U3 connected to their junction, so that the component at the output of the stage (i.e. at the emitter of Q2) is equal in amplitude and opposite in phase to that at the output of the tip-side driving circuit. Resistors R16 and R17 establish the desired ring-side output impedance.

Figure 5:
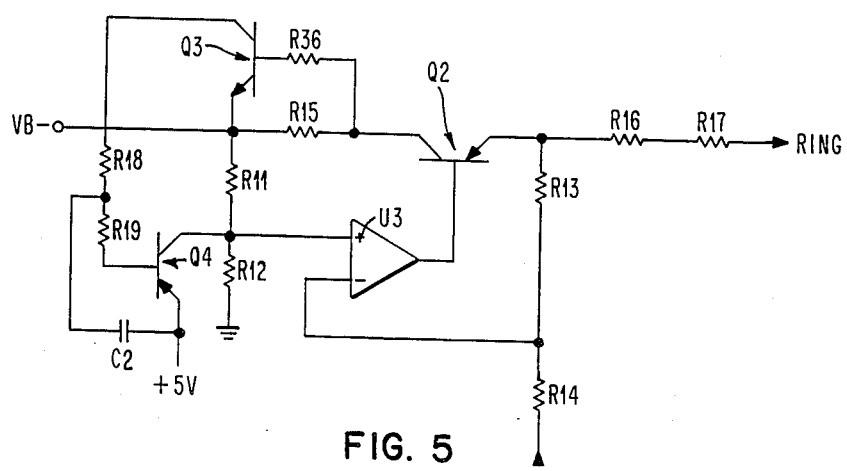
FIG. 5 is a schematic diagram of the ring-side driving circuit of FIG. 4 with an additional current limiting circuit.

4. Loop Current Limiting Circuit: The basic ring-side feed circuit (FIG. 4) is a constant voltage source. Referring to FIG. 5, if the loop resistance decreases, however, the loop current (and hence the voltage drop across resistor R15) increases, causing both transistors Q3 and Q4 to begin conducting. This makes the non-inverting input of U3 more positive (i.e. less negative), lowering the negative output voltage at the emitter of Q2. An equilibrium is attained wherein, as the loop resistance is further decreased, so is the output voltage, making the loop current nominally constant. None of this has any effect on the AC performance of the ring-side feed circuit; thus, as loop resistance decreases, the ring-side feed circuit is caused automatically to transfer from a constant DC voltage source to a constant DC current source remaining all the while a constant AC voltage source.

5. Transmit Amplifier Circuit:

Resistors R22 and R25 (FIG. 2) are selected so that, with a specific loop impedance across the tip and ring leads, equal voltages are applied from the tip-side driver to the inverting and non-inverting inputs, respectively, of differential amplifier U4, resulting in no U4 output. Similarly R23 and R24 apply equal voltages from the ring-side driver, also resulting in no U4 output. Thus, with the proper loop termination, no received signal is reflected back through the transmit amplifier, canceling this signal.

Speech information from the loop is connected through R10 and R25 to the non-inverting input of U4 and through R17 and R23 to the inverting input. R26 establishes the gain of the stage; R27 and R28 establish a DC output voltage range. Because the transmit amplifier is DC coupled to the loop circuit, its DC output voltage varies with loop current.

6. Hook Detection Circuit:

R29 and R30 (FIG. 2) shift the negative-polarity DC output of the transmit amplifier to a positive voltage which varies with loop current. This voltage is compared in comparator U5 with a reference voltage established by R31 and R32. R33 provides a positive output voltage when loop current is less than the level required for an off-hook output, making the output compatible with conventional logic families.

7. Overvoltage Protection:

Any positive voltage imposed on the loop (as by accidental connection to a power line or by a nearby lightning strike) is dropped across R10 (tip-side) or R17 (ring-side), the opposite ends of which are clamped to ground by D4 and D2 respectively. Likewise, any negative voltages are dropped across R10 or R17 and clamped to the voltage supply (VB−) by D3 and D1. Thus, because R10 and R17 are sufficiently large to withstand any expected overvoltage, and because D1–D4 are selected to handle the current induced by such a voltage, the SLIC is protected.

8. Ring Injection: Relay K1, controlled by a circuit not shown, switches the ring side of the station loop to a source of approximately 90 V RMS, 20 Hz in series with the supply voltage (VB−), thus ringing an on-hook (telephone) instrument in the loop circuit. When the instrument is taken off hook it exhibits a relatively low resistance. The resulting increase in loop current during the negative half cycle of ring voltage causes the hook detection circuit to indicate ring trip. Diode D4, part of the overvoltage protection circuit, serves also to sink ring current during the positive half cycle.

9. Power Denial Circuit:

When the deny power input DP is grounded, transistor Q5 conducts, putting a positive bias on the inverting input of U3 and shutting down Q2. This drops the loop current virtually to zero.

There has thus been shown and described a novel station line interface circuit which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. A telephone station subscriber line interface circuit for connecting a telephone subscriber station to a telecommunications transmission line, the interface circuit comprising, in combination:

(a) a loop current sensing circuit for providing an output signal proportionately indicative of a change in the DC resistance in the telecommunications transmission line;

(b) a ring-side driving circuit being coupled to said loop current sensing circuit and being responsive to said output signal and including source means for providing an alternating current voltage source and a controllable direct current voltage source to a transmit amplifier in periods of high constant DC resistance in the telecommunications transmission line, the ring-side driving circuit maintaining the output of said alternating current voltage source constant to the transmit amplifier and automatically modifying said direct current voltage source form an equivalent constant direct current voltage source to an equivalent constant direct current current source in the event of a decrease in the DC resistance in the telecommunications transmission line sensed by the loop current sensing circuit; and (c) a power denial circuit, the power denial circuit, in response to a control signal, deactivating the ring-side driving circuit, thereby causing the ring-side driving circuit to provide no current to the telecommunications transmission line.

2. A telephone station subscriber line interface circuit for coupling a telephone subscriber station to a telecommunications transmission line, said interface circuit comprising:

a loop current sensing circuit for sensing direct current (DC) resistance in said telecommunications transmission line and for providing an output signal proportionately representative of a change in said DC resistance:

a ring-side driving circuit including controllable supply means for providing an alternating current (AC) voltage source, a DC voltage source and a DC current source, said ring-side driving circuit being coupled to said loop current sensing circuit and being responsive to said output signal for providing said AC and said DC voltage sources to a transmit amplifier when said telecommunications transmission line exhibits high constant DC resistance, and when said telecommunications transmission line exhibits low DC resistance, providing said DC current source to said transmit amplifier while continuing to provide thereto said AC voltage source; and a power denial circuit coupled to said ring-side driving circuit for deactivating said ring-side driving circuit in response to a control signal such that said ring-side driving circuit provides no current to said telecommunications transmission line.

* * * * *